United States Patent [19]

Richard

[11] Patent Number: 5,077,804
[45] Date of Patent: Dec. 31, 1991

[54] TELECOMMUNICATIONS DEVICE AND RELATED METHOD

[76] Inventor: Dnaiel D. Richard, 305 Rim Shadows Dr., Sedona, Ariz. 86336

[21] Appl. No.: 625,460

[22] Filed: Dec. 11, 1990

[51] Int. Cl.⁵ ............................................. G06F 15/30
[52] U.S. Cl. ....................................................... 382/7
[58] Field of Search ........... 382/7; 364/715.03, 715.04

[56] References Cited

U.S. PATENT DOCUMENTS

| | | | |
|---|---|---|---|
| 4,193,119 | 3/1980 | Arase et al. | 364/900 |
| 4,251,867 | 2/1981 | Uchida et al. | 364/715.05 |
| 4,677,552 | 6/1987 | Sibley, Jr. | |
| 4,706,212 | 11/1987 | Toma . | |
| 4,766,293 | 8/1988 | Boston . | |
| 4,866,755 | 9/1989 | Hashimoto . | |
| 4,870,610 | 9/1989 | Belfer . | |
| 4,882,681 | 11/1989 | Brotz . | |
| 4,916,730 | 4/1990 | Hashimoto . | |
| 4,926,325 | 5/1990 | Benton et al. . | |
| 4,926,368 | 5/1990 | Morita et al. | 364/715.05 |
| 4,953,086 | 8/1990 | Fukatsu | 235/379 |
| 4,980,829 | 12/1990 | Okajima et al. | 364/900 |

FOREIGN PATENT DOCUMENTS

3412418 3/1985 Fed. Rep. of Germany .
60-119164 6/1985 Japan .

Primary Examiner—Stephen Brinich
Attorney, Agent, or Firm—R. Neil Sudol; Henry D. Coleman

[57] ABSTRACT

A facsimile telecommunications system includes a method for at least partially automatically converting monetary amounts in a document from one currency to a second currency. A document containing the monetary amounts is transmitted from a transmitting machine and displayed, printed or otherwise communicated at a receiving end of a telecommunications link. The monetary conversion may occur at any point in the telecommunications system, particularly at the transmitting facsimile device, the receiving facsimile device or a central facility operatively connected to a telecommunications network. The conversion is preferably accomplished fully automatically, with decoders being used for determining identities of input and output currencies.

33 Claims, 6 Drawing Sheets

TELECOMMUNICATIONS DEVICE AND RELATED METHOD

BACKGROUND OF THE INVENTION

This invention relates to telecommunications. More particularly, this invention relates to a device and a method which is utilizable in a telecommunications system for facilitating the international transmission of documents.

The advent of facsimile or telecopier machines has nearly revolutionized the telecommunications industry. Documents can now be transmitted from one location to another over the telephone networks nearly instantaneously. Facsimile transmissions are made between continents and over oceans as easily as across the street. The versatility of application has greatly facilitated international commerce and business.

OBJECTS OF THE INVENTION

An object of the present invention is to provide an improved method and apparatus for the international transmission of documents, particularly financial type documents.

Another object of the present invention is to provide a method and apparatus which generally accelerates international communications.

An additional object of the present invention is to provide such a method and apparatus which facilitates international financial transactions.

Another, more particular, object of the present invention is to provide such a method and apparatus which can be implemented in different ways.

More specifically, an object of the invention is to provide a communications facilitating device which can be implemented at a transmitting station, a receiving station or a central, intermediate station.

SUMMARY OF THE INVENTION

A telecommunications device comprises, in accordance with the present invention, a document input component for generating in a digitally encoded format a document including a representation of a monetary amount in a first currency. The device further comprises a recognition component operatively connected to the document input component for recognizing the monetary amount in the first currency, i.e., for automatically determining that a monetary amount is included in the document, for recognizing the currency and for determining the amount, as measured in that currency. An identification component is provided for identifying a second currency, while a currency converter is operatively connected to the recognition component and the identification component for converting the monetary amount to an equivalent amount in the second currency. A transmitter is operatively connected to the currency converter for transmitting the computed equivalent amount in digitally encoded form to a remote location.

Pursuant to another feature of the present invention, the currency converter includes an electronic conversion table for storing monetary conversion rates from the first currency to the second currency.

Pursuant to a further feature of the present invention, the currency converter includes an electronic conversion table for storing monetary conversion rates from the first currency to a multiplicity of different currencies.

Pursuant to an additional feature of the present invention, the device further comprises a currency selector operatively connected to the identification component and the electronic conversion table for selecting one of the plurality of different currencies in the conversion table as the second currency in accordance with signals from the identification component.

In accordance with a particular feature of the invention, a destination selector is operatively connected to either the document input component or the transmitter or both for selecting an ultimate destination of the document, the identification component being operatively connected to the destination selector for identifying the second currency in accordance with a selected destination of the document.

Alternatively, the identification component includes an input component for enabling an operator to direct selection of the second currency from among a plurality of different currencies.

The device may optionally include an output component such as a printer or a monitor operatively connected to the currency converter for producing an output document including the equivalent amount in a visually readable format.

Pursuant to yet another feature of the present invention, the document input component includes a scanner for generating the document from a printed copy thereof.

Pursuant to still another feature of the present invention, the document input component includes circuitry and programming for generating in a digitally encoded format in the document words in a first natural language. The device further comprises a language translator operatively connected to the document input component for translating the input words to digitally encoded words of a second natural language, the transmitter being operatively connected to the translator for transmitting the digitally encoded words to the remote location, together with the equivalent amount (in the second currency).

A method for communicating monetary information comprises, in accordance with the present invention, the steps of generating a first digital signal encoding the monetary information in a first currency, automatically generating, from the first digital signal, a second digital signal encoding the monetary information in a second currency, and transmitting the second digital signal to a remote location.

Pursuant to a specific feature of the present invention, the step of generating includes the step of scanning a printed document including the monetary information in the first natural language.

The method advantageously further comprises the step of at least partially automatically selecting the second currency from one of a plurality of different currencies. The selection may be implemented by determining a destination of the second digital signal, the second currency being automatically selected in accordance with the destination.

A telecommunications device in accordance with another embodiment of the present invention comprises a receiver for receiving, from a remote transmitting station and in a digitally encoded format, an input document including a monetary amount in a first currency. A recognition component is operatively connected to the receiver for recognizing the monetary amount in the first currency. A currency converter is operatively connected to the recognition component for converting the monetary amount to an equivalent amount in the second currency. In addition, an output component is operatively connected to the currency converter for producing an output document including the equivalent amount in the second currency in a visually readable format, e.g., on a computer monitor screen or on a printed document.

Pursuant to another feature of the present invention, the output component includes circuitry and/or programming responsive to the receiver for producing the input document including the monetary amount in the first currency in a visually readable format. This feature enables a visual checking or comparison of the original amount and the converted amount.

Pursuant to yet another feature of the present invention, the currency converter includes an electronic conversion table for storing monetary conversion rates from the first currency to the second currency.

As in the case of the first embodiment of the present invention, where the currency converter is located at the transmitting station, the currency converter at the receiving station includes an electronic conversion table for storing monetary conversion rates from a multiplicity of different currencies to the second currency.

Moreover, as in the first embodiment, circuitry may be provided for effectuating an automatic language translation, as well an an automatic currency conversion. More specifically, the receiver includes means for receiving in the input document words in a first natural language, while the receiving station further includes a translator operatively connected to the receiver for translating the incoming words to digitally encoded words of a second natural language. The output component includes means for producing in the output document the digitally encoded words in the second natural language in a visually readable format.

An associated method for communicating monetary information comprises the steps of receiving from a remote transmitting station a first digital signal encoding the monetary information in a first currency, at least partially automatically generating, from the first digital signal, a second digital signal encoding the monetary information in a second currency, and, in response to the second digital signal, producing an output document including the monetary information in the second currency in a visually readable format.

Pursuant to a feature of the present invention, the step of generating the second digital signal includes the step of determining from an electronic currency conversion table an electrically encoded amount of the second currency corresponding to an amount of the first currency.

The output document may be produced, for example, by displaying the output document on a monitor or by printing the output document.

A telecommunications device in accordance with yet another embodiment of the present invention comprises a receiver for receiving, from a remote transmitting station and in a digitally encoded format, an input document including a monetary amount in a first currency, a recognition component operatively connected to the receiver for recognizing the monetary amount in the first currency, an identification component for identifying a second currency, a currency converter operatively connected to the recognition component and the identification component for converting the monetary amount to an equivalent amount in the second currency, and a transmitter operatively connected to the currency converter for transmitting the equivalent amount in digitally encoded form to a remote location.

As mentioned hereinabove with respect to the first two embodiments and their associated methods, the currency converter includes electronic conversion table means for storing monetary conversion rates among a multiplicity of different currencies. In addition, the identification component includes means for determining the identity of the second currency from an ultimate destination of the document. Alternatively, the identification component includes means for determining the identity of the second currency from a code word transmitted with the input document from the remote transmitting station.

As discussed hereinabove, language translation capability may be provided. The language translation is implemented by a translator component which is operatively connected to the receiver for enabling translation of incoming words in a first natural language to digitally encoded words of a second natural language. The transmitter is operatively connected to the translator for transmitting the digitally encoded words to the remote location.

A corresponding telecommunications method comprises the steps of receiving, from a first remote location and in a digitally encoded format, an input document including amounts in a first currency, at least partially automatically converting the amounts to digitally encoded amounts of a second currency, and transmitting the digitally encoded amounts to a second remote location.

BRIEF DESCRIPTION OF THE DRAWING

FIG. 6 is a block diagram, which together with FIG. 5A and FIG. 7 shows details of the translating and currency conversion component of FIG. 3.

DETAILED DESCRIPTION

Figure 1:
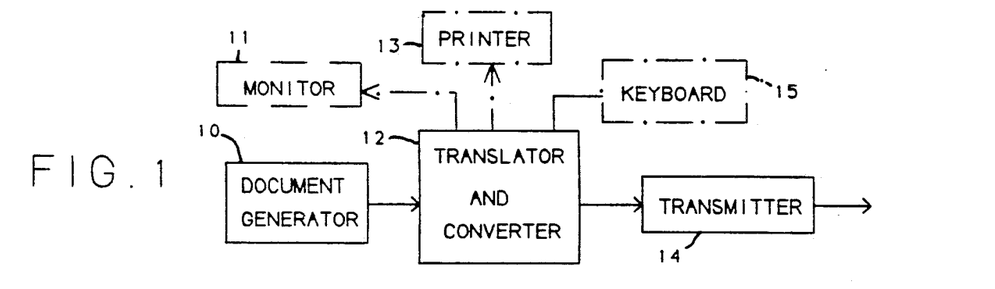
FIG. 1 is a block diagram of an embodiment of the present invention, showing a transmitting facsimile device provided with a language translating and currency conversion component.

As illustrated in FIG. 1, a telecommunications device with language translating and currency conversion capability comprises a document generator or input component 10 for generating in a digitally encoded format a document including words in a first natural language (the input language). The telecommunications device of FIG. 1 further comprises a translator and currency conversion unit 12 operatively connected to document generator 10 for translating the words of the document from the generator to digitally encoded words of a second natural language (the output language) and for converting monetary amounts of a first currency (the incoming currency) to equivalent amounts in a second currency (the output currency). Translator and currency conversion unit 12 is operatively coupled to a transmitter 14. Transmitter 14 provides a link to a telecommunications network (not shown) including wire and fiber transmission paths and a long distance communications link. Transmitter 14 outputs onto the telecommunications network the translated words and the converted currencies of the document in digitally encoded form. The transmitter also transmits in known fashion signals controlling the destination of the output signal at a remote location.

Document generator 10 may take virtually any form capable of producing digitally encoded alphanumeric characters. Possible realizations of generator 10 include a scanner (see FIG. 4) or a word processor. Such a scanner or word processor is used to produce documents some of which, like bills, invoices, balance sheets, and other financial documents, contain monetary amounts in a predetermined currency.

Translator and currency conversion unit 12 (hereinafter "translator/converter") may be connected at a pair of outputs to a monitor 11 and a printer 13 for providing visual feedback to an operator. More particularly, translator/converter 12 may display on monitor 11 or print out via printer 13 the translated output document, with monetary amounts converted into a different currency, to enabling checking by the operator. If necessary, the operator may modify the translation and/or monetary conversion via an auxiliary input component such as a keyboard 15.

Figure 2:
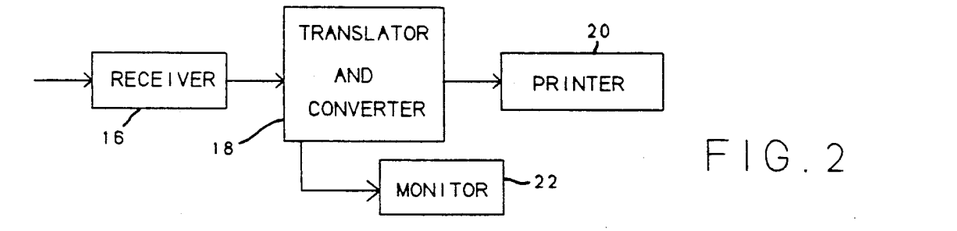
FIG. 2 is a block diagram of another embodiment of the present invention, showing a receiving facsimile device provided with a language translating and currency conversion component.

As depicted in FIG. 2, another telecommunications device with language translating and monetary conversion capability comprises a receiver 16 which is linked to a telecommunications network for receiving digitally encoded information therefrom. Specifically, the incoming information includes encoded alphanumeric characters of a first natural language arriving at receiver 16 from a remote location generally in a country different from the country in which the telecommunications device of FIG. 2 is located. The incoming information may also include financials sums.

Receiver 16 is operatively connected to a translator/converter 18 which translates the words of an incoming document arriving at receiver 16 to digitally encoded words of a second natural language (the output language) and which converts monetary amounts of a first currency (the incoming currency) to equivalent amounts in a second currency (the output currency). Translator/converter 18, like translator/converter 12, may take the form of a general purpose digital computer programmed to perform translations and currency conversions. Translator/converter 18 may be specially designed to translate into one given language (the output language) any of a plurality of possible input languages and further to convert into one given currency (the output currency) any of a plurality of different possible input currencies. In contrast, it is contemplated that translator/converter 12 is specifically configured to translate one given language (the input language) and one currency (the input currency) into any of a predetermined plurality of possible output languages.

Translator/converter 18 is operatively connected to a printer 20 or other output device which preferably produces relatively permanent copies of incoming documents which have been automatically translated by translator/converter 18. Printer 20 also produces in a hard copy form the incoming document in the original natural language (with original monetary amounts).

Alternatively, or additionally, translator/converter 18 may be connected to a monitor 22 for temporarily displaying a translated/converted document, for example, to enable correction and modification by an operator. To that end, it is desirable for an incoming document to be displayed in both the original language (i.e., the input language) and the translation (i.e., the output language).

The embodiments of FIGS. 1 and 2 are particularly suited for applications in which the number of possible output languages and input languages, respectively, are minimal. Such a situation would occur, for example, in the case of a corporation with facilities in a limited number of countries. The telecommunications devices of FIGS. 1 and 2 would then require only a limited memory capacity sufficient for translating specialized documents from one natural language to at most a few natural languages, or vice versa, from a few languages to one language.

Some applications may, however, require a greater translating capability. For example, if an organization in one country has business or governmental contacts in many countries, it will generally be necessary to transmit documents to different people each having respective home language. Similarly, that organization will receive documents in many different languages.

Figure 3:
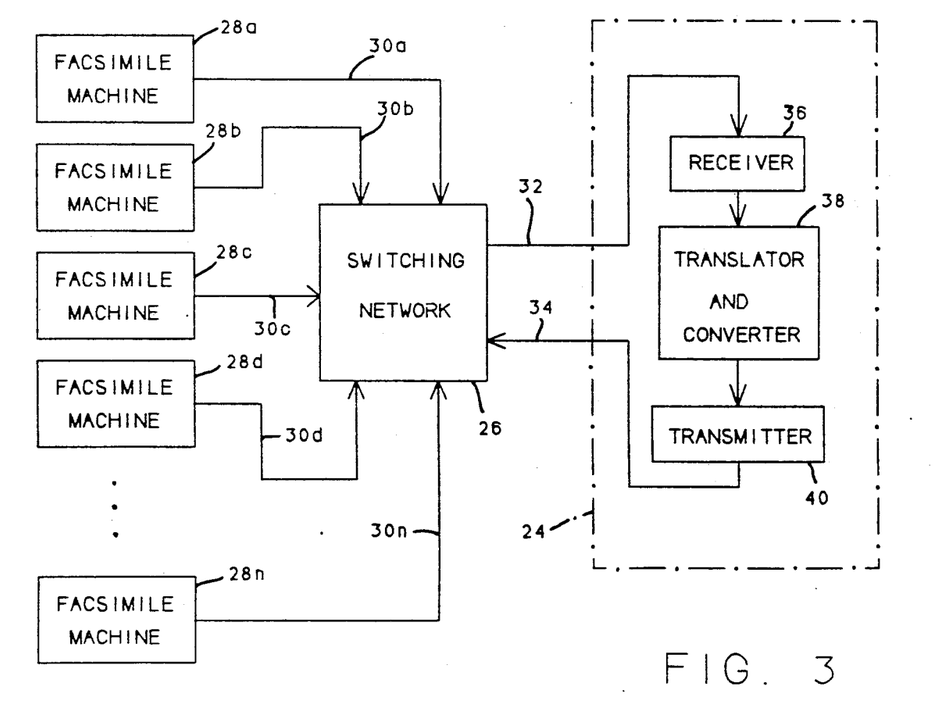
FIG. 3 is a block diagram of yet another embodiment of the present invention, showing a telecommmunications system with a central transmission and receiving facility provided with a language translating and currency conversion component.

Accordingly, a telecommunications device 24 with language translating and currency conversion capability may be connected in a telecommunications system as illustrated in FIG. 3. A telephone switching network 26 is connected to a plurality of facsimile machines 28a, 28b, 28c, 28d, . . . 28n via respective long distance telecommunications links 30a, 30b, 30c, 30d, . . . 30n and to language-translating telecommunications device 24 via links 32 and 34.

Telecommuncications device 24 comprises a receiver 36 which is linked to switching network 26 via link 32 for receiving digitally encoded information from network 26. Specifically, the incoming information includes encoded alphanumeric characters of a first natural language arriving at receiver 36 from a facsimile machine 28a, 28b, 28c, 28d, . . . 28n which may be located in a country different from the country in which the telecommunications device of FIG. 3 is located. The incoming information may also include encoded monetary sums in one or more currencies.

The incoming information also includes data as to the destination of the document, particularly the city and country in which an intended receiving facsimile machine 28a, 28b, 28c, 28d, . . . 28n is located. In addition, the incoming information may include a specification of the target or output language, which may or may not correspond to the natural language of the destination country. In cases where the target or output language is not separately specified, telecommuncications device 24, particularly a translator/converter 38 thereof, may be programmed to select the output language in accordance with the destination country.

Furthermore, the incoming information may include a specification of a target or output currency, which may or may not correspond to the home currency of the destination country. In cases where the target or output currency is not separately specified, telecommunciations device 24, particularly a translator/converter 38 thereof, may be programmed to select the output currency in accordance with the destination country.

Receiver 36 is operatively connected to translator/converter 38 which serves to translate an incoming document arriving at receiver 36 to digitally encoded words of a second natural language, i.e., the output language. Translator/converter also serves to convert any monetary sums in the incoming document to digitally encoded sums in a second currency, i.e., the output currency. Translator/converter 38, like translator/converter 12, may take the form of a general purpose digital computer programmed to perform translations and monetary conversion. Translator/converter 38 is specially designed to translate into any one of a plurality of given natural languages (the output language) any of a plurality of possible input languages and further to convert into any one of a multiplicity of given world currencies (the output currency) any of a plurality of possible input currencies.

Translator/converter 38 is operatively connected to a transmitter 40 which in turn is coupled to switching network 26 via link 34. Switching network 26 forwards a digitally encoded translated document from telecommunciations device 24 to a remote facsimile machine 28a, 28b, 28c, 28d, . . . 28n in accordance with a destination code included in the digital signal. Telecommunications device 24 may include circuitry for transmitting to switching network 26 a document in digital format both in the original input language and in a translated, output language, together with a code identifying the documents as being different language versions of the same information, intended for the same destination. Of course, output signal of telecommunciations device 24 includes other information ordinarily incorporated in digital facsimile signals such as the telephone number of the originating station.

Translator/converter 38 is also provided with circuitry for determining the natural language of an incoming document. That function is performed by decoding a signal component identifying the input language. Alternatively, in an absence of such a prearranged signal, translator/converter 38 is designed to determine the identity of the input language from words in the document. To that end, translator/converter 38 compares selected words of the input document with electrically encoded words of different natural languages stored in electronic dictionaries. To facilitate the automatic language detection, translator/converter 38 samples first the dictionary or dictionaries corresponding to the language or languages which are endemic to the country of origin of the incoming document. For example, a letter arriving from Canada would be presumed to be in English or French, while a word arriving from Belgium would be presumed to be in French or Flemish. Other languages would then be sampled in a predetermined sequence to minimize detection time.

Translator/converter 38 further incorporates circuitry for determining the amounts and identifying the currencies of any monetary sums in an incoming document. That function includes steps of recognizing that a sequence of digital signal encodes a numerical amount which is a monetary sum, decoding that sequence to determine the amount involved, and decoding the characters identifying the currency. To that end, translator/converter 38 compares selected characters or symbols in the input document with electrically encoded symbols of different world currencies stored in an electronic dictionary.

Figure 4:
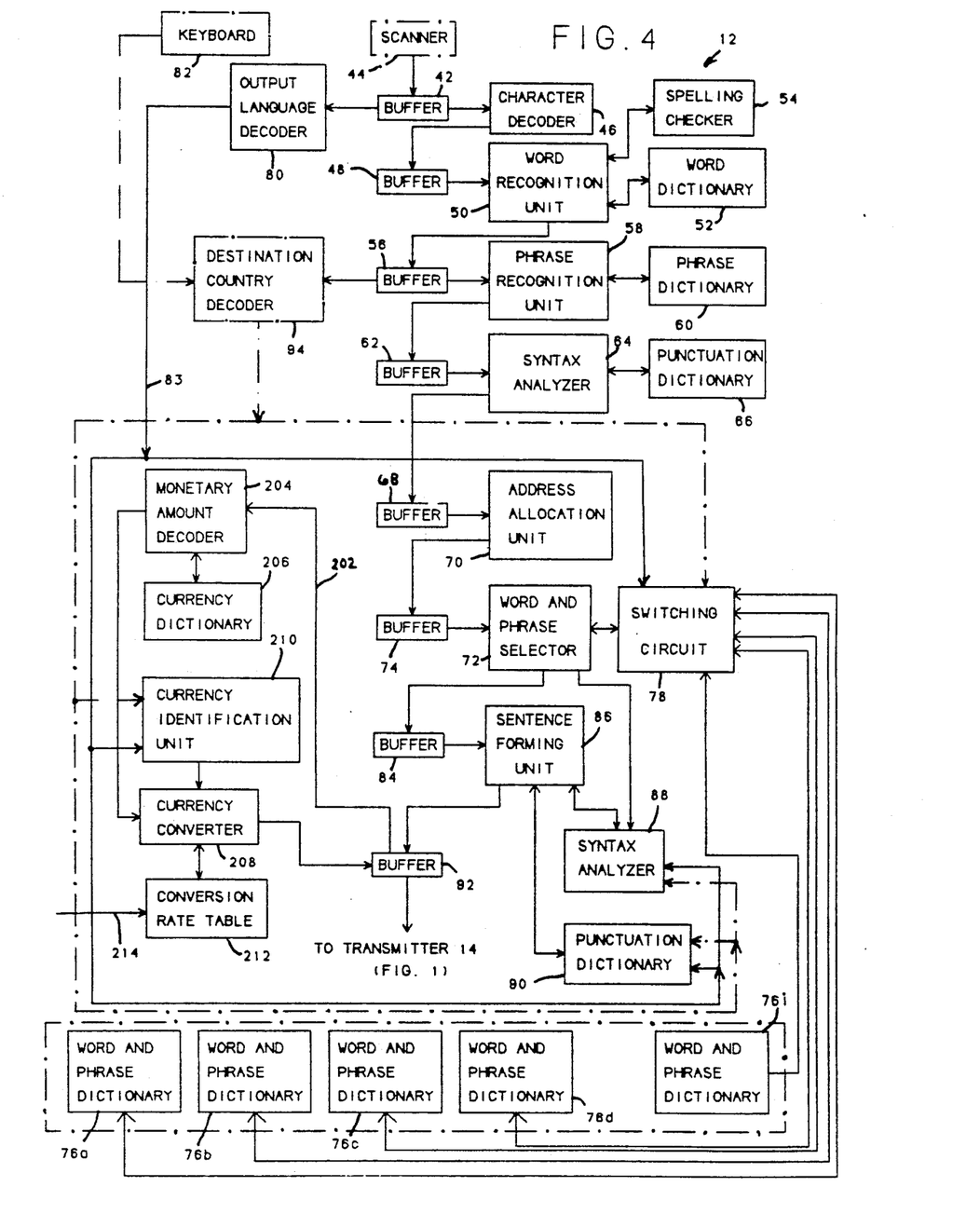
FIG. 4 is a block diagram showing details of the translating and currency conversion component of FIG. 1.

As shown in FIG. 4, translator/converter 12 (FIG. 1) includes an input buffer 42 which receives an incoming digital signal from a scanner 44 which is a particular form of document generator 10 (FIG. 1). Buffer 42 stores the incoming digital signal so that it may be analyzed by a character decoder 46 to determine the individual alphanumeric characters or script symbols (in the case, for example, of an Oriental or Middle Eastern language). The characters identified by decoder 46 are loaded in digitally encoded form into a buffer 48 at the output of character decoder 46.

The characters in buffer 48 are grouped and deciphered by a word recognition unit 50 which accesses a word dictionary 52 to retrieve digitally encoded words with which to compare the grouped characters stored in buffer 48. Word dictionary 50 basically contains words of a single natural language, the input language. A telecommunciations device of FIG. 1 used, for example, in Spain, will have Spanish words encoded in dictionary 52. In a device used in Switzerland, dictionary 52 will generally store words of German, Italian or French. Of course all three languages may be stored in the same dictionary, depending on the memory capacity, or else separate dictionaries may be connected to word recognition unit 50, as described hereinafter with reference to FIG. 5A.

Word recognition unit 50 is also connected to a spelling checker 54 which is consulted when unit 50 has failed to identify a character grouping in buffer 48. Spelling checker 54 is linked to word dictionary 52 for enabling the performance of the spelling check function.

Dictionary 52 may be programmed to include specialized vocabulary specific to particular fields of use. For example, if the telecommunciations device were to be used in a medical lab, dictionary 52 would include an enhanced portion of medical and/or scientific terms. As another example, the telecommunciations device could be used in a law firm and dictionary would consequently be programmed to contain legal terms not in general use.

Upon associating a character grouping with a word stored in dictionary 52, word recognition unit 50 generates a code identifying the word and transmits that code to another buffer 56. Words that are not so identified by code, for example, proper names, and other words which are not found in dictionary 52, even after a spelling check has been performed, are each transmitted as the respective sequence of character codes which was loaded into buffer 48 by character decoder 46.

The word codes in buffer or memory unit 56 are examined by a phrase recognition unit 58 to determine whether two or more words may be grouped together to form an idiomatic expression, with a meaning different from the meanings of the individual words in the group. To that end, phrase recognition unit consults a phrase dictionary 60. Phrases readily identifiable as having idiomatic meansings are coded by phrase recognition unit 58, the codes being loaded into a buffer or memory unit 62 downstream of the word recognition unit. Words which are not combined with other words to form an idiomatic expression are transfered in digitally coded form from buffer 56 to buffer 62 by word recognition unit 58. Proper names and other character groupings which have not been identified are each transfered from buffer 56 to buffer 62 as the respective sequence of character codes which was loaded into buffer 48 by character decoder 46.

The sequence of character codes, word codes and idiomatic phrase codes in buffer 62 is accessed by a syntax analyzer 64 which examines sentence structure, in conjunction with punctuation and other grammatical rule information stored in a punctuation dictionary 66. From punctuation, word order, parts of speech, and other meaning cues inherent in the language of the input document, analyzer 64 divides the words and phrases in buffer 62 into larger groups in part determinative of sentence meaning and generates digital codes indicative of that meaning. The results of the analysis by analyzer 64 are added to the digital codes in buffer 62, the augmented digital signal being loaded in another buffer or memory unit 68.

An address allocation unit 70 is connected to buffer 68 for reorganizing the character, word, phrase, clause and sentence codes therein and assigning a sequence of address codes for enabling a word and phrase selector 72 connected to a buffer or memory unit 74 at the output of address allocation unit 70 to retrieve appropriate word and phrase codes of an output language from a corresponding word and phrase dictionary 76a, 76b, 76c, 76d, . . . 76i. Dictionaries 76a, 76b, 76c, 76d, . . . 76i contain coded words and idiomatic expressions for respective natural languages. Access of selector 72 to dictionaries 76a, 76b, 76c, 76d, . . . 76i is controlled by a switching circuit 78 in response to signals from an output language decoder 80. Decoder 80 is operatively connected to input buffer 42 for determining from an incoming input document bit stream a language code inserted, for example, by scanner 40 in the bit stream in response to a manual selection by a human operator. Alternatively, decoder 80 may be directly connected to another input device, such as a keyboard 82, for determining from input signals therefrom, the identity of a selected output language.

Decoder 80 is provided with an output lead or multiple 83 extending to a switching input of switching circuit 78 for inducing that unit to connect word and phrase selector 72 to a dictionary 76a, 76b, 76c, 76d, . . . or 76i corresponding to a selected output language.

Word and phrase selector 72 outputs to a buffer or memory unit 84 a sequence of digital codes including the original character codes for untranslatable proper names and other unidentifiable phraseology, as well as new word and phrase codes taken from the selected dictionary 76a, 76b, 76c, 76d, . . . or 76i by word and phrase selector unit 72. The codes in buffer 84 are then organized by a sentence forming unit 86 into meaningful sequences in accordance with the syntax of the selected output language. Syntax information is supplied to sentence forming unit 86 by a syntax analyzer and storage unit 88. That unit includes a plurality of syntax dictionaries (not illustrated) for storing information about word order and sentence structure for each of a plurality of possible output languages and further includes a switching unit (not illustrated) connected to output lead or multiple 83 of decoder 80 for selecting the appropriate syntax dictionary in accordance with the selected output language.

Sentence forming unit 86 also inserts codes for punctuation marks. The punctuation information is supplied to sentence forming unit 86 by a punctuation dictionary 90 which comprises a plurality of punctuation sub-dictionaries (not illustrated) for storing punctuation information for each of the possible output languages and further comprises a switching unit (not illustrated) connected to output lead or multiple 83 of decoder 80 for selecting the appropriate punctuation subdictionary in accordance with the selected output language.

The sequence of codes generated or transfered by sentence forming unit 86 is loaded into an output buffer 92. Buffer 92 is connected via an output lead 202 to a monetary decoder 204 which recognizes that a sequence of digital signals stored in buffer 192 encodes a numerical amount which is a monetary sum. Decoder 204 decodes that sequence to determine the amount involved, and also decodes the characters identifying the currency. To that end, decoder 204 compares selected characters or symbols in the document in buffer 92 with electrically encoded symbols of different world currencies stored in an electronic dictionary 206.

Decoder 204 transfers to currency converter 208 the encoded amount and the encoded currency, as detected and deciphered by decoder 204. Currency converter 206 also receives a signal from a currency identification unit 210 which serves to determine the output currency, i.e., the currency into which the subject monetary amount is to be converted. Currency identification unit 210 determines the output currency in response to a signal from output language decoder 80. That component monitors incoming signals from keyboard 82 which may indicate not only the destination language but also the output currency, which may or may not correspond to the destination language or to the destination country to which the document is to be transmitted.

In response to the signals from decoder 204 and currency identification unit 210 identifying the input currency and the output currency, currency converter 208 accesses a conversion rate table 212 to obtain a conversion rate from the input currency to the output currency. Using the retrieved conversion rate, currency converter 208 calculates an amount in the output currency equivalent to the amount specified in the input document in the input currency. Currency converter 208 then inserts the converted or equivalent amount into the translated document, which is stored in buffer 92. That converted or equivalent monetary amount may be substituted for the original amount or, alternatively, may be inserted as an addition (e.g., in parentheses) to the document.

Conversion rate table 212 is provided with an input 214 for enabling periodic (e.g., daily) updating of the conversion rate contents of the table. The updating may be done automatically, for example, in response to signals received from a service facility to which organizations subscribe to obtain the updated currency conversion rates.

Buffer 92 may be provided with a digitization circuit (not shown) for converting the sequence of word, phrase and punctuation codes into a digitized sequence of bits representing light or dark values of an array of contigous regions on a two-dimensional document, such a digitized sequence conforming in part to the output signal of a conventional facsimile transmission machine. Other portions of the output signal of the telecommunications device of FIG. 1 are inserted in the digitized bit stream from buffer 92 by transmitter 14.

It is to be noted that the telecommunications device of FIG. 1, including the translator/converter 12 of FIG. 4, is adapted specially for the processing of documents which contain information solely in alphanumeric form. However, the device can also handle documents including, for example, graphic or pictorial type information. Such information is transfered through translator/converter 12 without processing into linguistic codes.

FIG. 4 also illustrates a destination country decoder 94 useful as an alternative or supplement to output language decoder 80. In the event that the input document bit stream from scanner 44 fails to contain a code designating a selected output language, destination country decoder 94 decodes information in buffer 56 to determine the destination country. This process may be implemented, for example, by examining addressing information in the document or from another signal, e.g., from keyboard 82, specifying a receiving telephone number to which the input document is being directed. Upon determining the destination country, decoder 94 selects a target or output language in accordance with that determination. For example, if the destination country is West Germany, decoder 94 selects German as the output language, whereas if the destination country is Argentina or Brazil, decoder 94 selects the target or output language as Spanish or Portuguese, respectively. Like decoder 80, decoder 94 is linked to switching circuit 78, syntax analyzer 88 and punctuation dictionary 90, for controlling language selection therein.

With respect to the currency conversion function of the translator/converter 12 shown in FIG. 4, currency identification unit 210 may operate in conjunction with or in response to signals from destination country decoder 94. In the event that no separate signal is received from keyboard 82 and in the event that no specification is incorporated in the input to buffer 42 which identifies the output currency, currency identification unit 210 operate in conjunction with destination country decoder 94 to select the output currency in accordance with the country to which the incoming document is destined.

Figure 5A:
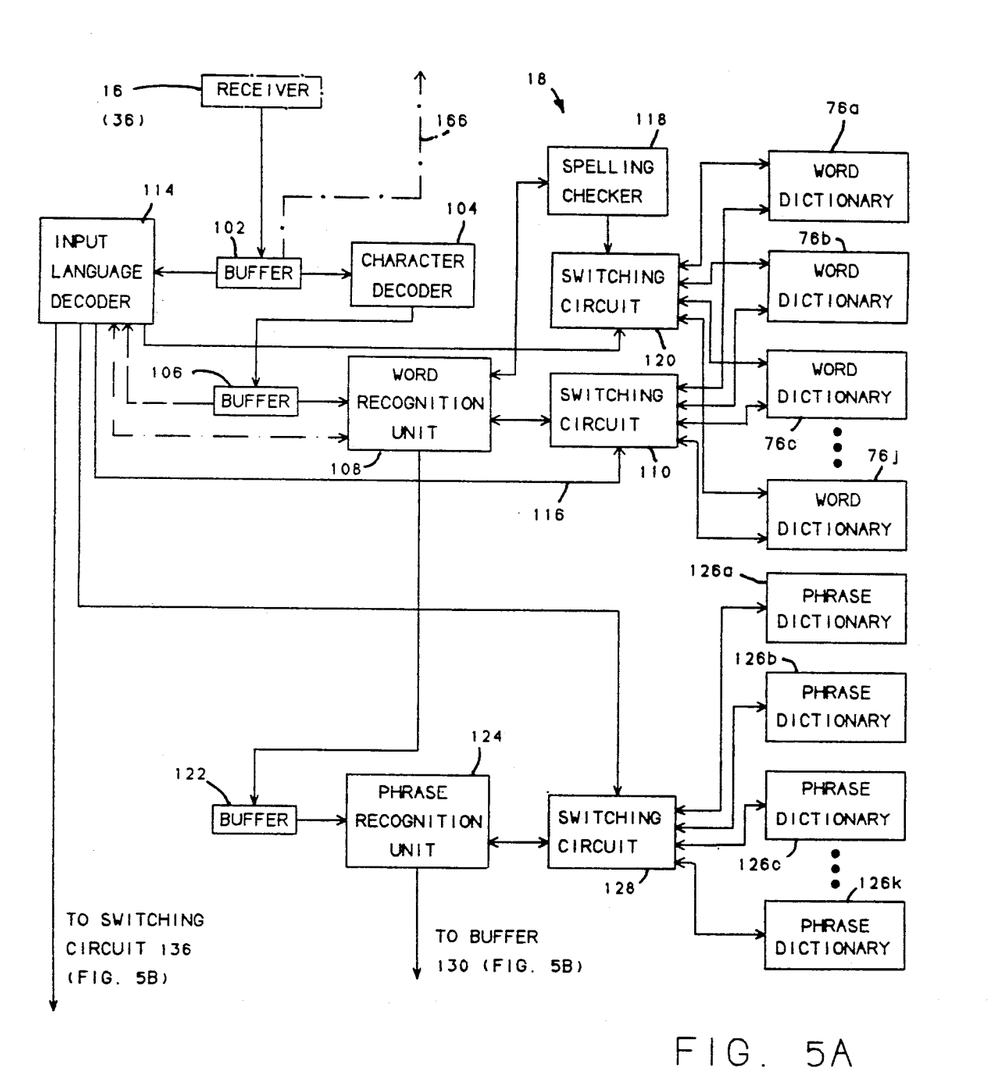
FIGS. 5A and 5B are a block diagram showing details of the translating and currency conversion component of FIG. 2.
Figure 5B:
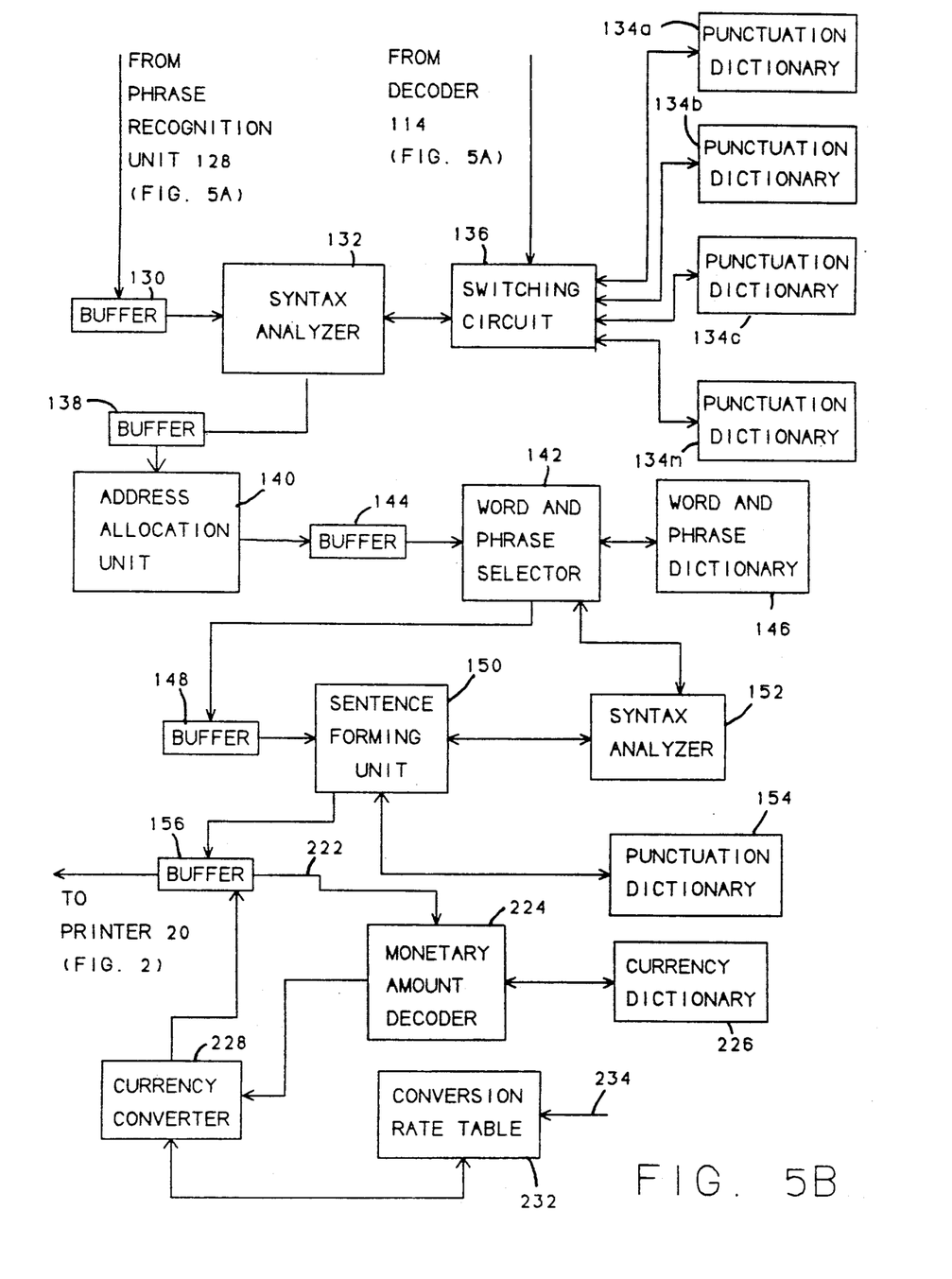

As illustrated in FIGS. 5A and 5B, translator/converter 18 of the telecommunications device of FIG. 2 includes an input buffer 102 which receives an incoming digital signal from receiver 16 (FIG. 1). Buffer 102 stores the incoming digital signal so that it may be analyzed by a character decoder 104 to determine the individual alphanumeric characters or script symbols (in the case, for example, of an Oriental or Middle Eastern language). The characters identified by decoder 104 are loaded in digitally encoded form into a buffer 106 at the output of character decoder 104.

The characters in buffer 106 are grouped and deciphered by a word recognition unit 108. Word recognition unit 108 is connected to a switching circuit 110 for accessing a word dictionary 112a, 112b, 112c, ... or 112j to retrieve digitally encoded words with which to compare the grouped characters stored in buffer 106.

Each word dictionary 112a, 112b, 112c, ... or 112j contains digital codes corresponding to words of a respective natural language. The word dictionary 112a, 112b, 112c, ... or 112j accessed by word recognition unit 108 via switching circuit 110 is determined by an input language decoder 114 operatively connected to buffer 102 for detecting and decoding a signal component included in an incoming digital signal loaded into buffer 102 from receiver 12. That signal component is inserted into the digital signal by a transmitter (not shown) and identifies the natural language of a document (the input document) encoded in the incoming digital signal. Upon detecting and decoding the signal component identifying the input language, i.e., the language of the arriving document, decoder 114 generates a signal on an output lead or multiple 116 extending to a control input of switching circuit 110 for inducing that circuit to connect word recognition unit 1108 to the word dictionary 112a, 112b, 112c, ... or 112j corresponding to the input language.

As shown in FIG. 5A, decoder 114 may be coupled to buffer 106 for receiving the character codes therefrom for purposes of determing the identity of the input language. Alternatively, word recognition unit 108 and language decoder 114 may cooperate to determine the identity of an input language, i.e. the natural language of an input document, by scanning dictionaries 112a, 112b, 112c, ... 112j to locate words corresponding to character groupings in buffer 106. That method is useful in the event that no separate signal component is included in an incoming digital signal for identifying the natural language of the respective input document. To implement the method, decoder 114 may be connected to word recognition unit 108 for receiving a signal therefrom indicating whether words of an input document signal are found in a word dictionary 112a, 112b, 112c, ... or 112j to which the word recognition unit is connected via switching circuit 110. If no correlation is found, decoder 114 switches circuit 110 to connect word recognition unit 108 to a different dictionary 112a, 112b, 112c, ... 112j.

Word recognition unit 108 is also connected to a spelling checker 118 which is consulted when unit 108 has failed to identify a character grouping in buffer 106. Spelling checker 118 is linked to word dictionaries 112a, 112b, 112c, ... 112j via a switching circuit 120 for enabling performance of the spelling check function. Switching circuit 120 is controlled by an output signal of decoder 114.

Dictionaries 112a, 112b, 112c, ... 112j may be programmed to include specialized vocabulary specific to particular fields of use. For example, if the telecommunciations device of FIG. 2 were to be used in a medical lab, dictionary 52 would include an enhanced portion of medical and/or scientific terms. As another example, the telecommunciations device could be used in a law firm and dictionaries 112a, 112b, 112c, ... 112j would consequently be programmed to contain legal terms not in general use. Dictionaries 112a, 112b, 112c, ... 112j may also be programmed for even more specific uses to include proper names which may have a translation to the output language (see below).

Upon associating a character grouping with a word stored in a selected dictionary 112a, 112b, 112c, ... 112j, word recognition unit 108 generates a code identifying the word and transmits that code to another buffer 122. Words that are not so identified by code, for example, proper names, and other words which are not found in the selected dictionary 112a, 112b, 112c, ... 112j, even after a spelling check has been performed by unit 118, are each transmitted as the respective sequence of character codes which was loaded into buffer 106 by character decoder 104.

The word codes in buffer or memory unit 122 are examined by a phrase recognition unit 124 to determine whether two or more words may be grouped together to form an idiomatic expression, with a meaning different from the meanings of the individual words in the group. To that end, phrase recognition unit 124 consults a phrase dictionary 126a, 126b, 126c, . . . or 126k selected by a switching circuit 128 under the control of decoder 114. Phrases readily identifiable as having idiomatic meansings are coded by phrase recognition unit 124, the codes being loaded into a buffer or memory unit 130 (FIG. 5B) downstream of the word recognition unit. Words which are not combined with other words to form an idiomatic expression are transfered in digitally coded form from buffer 122 to buffer 130 by word recognition unit 124. Proper names and other character groupings which have not been identified are each transfered from buffer 122 to buffer 130 as the respective sequence of character codes which was loaded into buffer 106 by character decoder 104.

As illustrated in FIG. 5B, the sequence of character codes, word codes and idiomatic phrase codes in buffer 130 is accessed by a syntax analyzer 132 which examines sentence structure, in conjunction with punctuation and other grammatical rule information stored in a punctuation dictionary 134a, 134b, 134c, . . . 134m selected by a switching circuit 136 under the control of decioder 114. From punctuation, word order, parts of speech, and other meaning cues inherent in the language of the input document, analyzer 132 divides the words and phrases in buffer 130 into larger groups in part determinative of sentence meaning and generates digital codes indicative of that meaning. The results of the analysis by analyzer 132 are added to the digital codes in buffer 130, the augmented digital signal being loaded in another buffer or memory unit 138.

An address allocation unit 140 is connected to buffer 138 for reorganizing the character, word, phrase, clause and sentence codes therein and assigning a sequence of address codes for enabling a word and phrase selector 142 connected to a buffer or memory unit 144 at the output of address allocation unit 140 to retrieve approriate word and phrase codes of an output language from a word and phrase dictionary 146 corresponding to a single output language into which all incoming documents are translated. Dictionary 146 contains coded words and idiomatic expressions for that one output language. Generally, it is contemplated that the output language is the home language of the office or organization in which the telecommunications device of FIG. 2 is located. Thus, a receiving type telecommunications device (FIG. 2) located in the Philippines will have Spanish as the output language.

Word and phrase selector 142 outputs to a buffer or memory unit 148 a sequence of digital codes including the original character codes for untranslatable proper names and other unidentifiable phraseology, as well as new word and phrase codes taken from the dictionary 146 by word and phrase selector unit 142. The codes in buffer 148 are then organized by a sentence forming unit 150 into meaningful sequences in accordance with the syntax of the output language. Syntax information is supplied to sentence forming unit 150 by a syntax analyzer and storage unit 152. Syntax unit 152 may also be connected to word and phrase selector 142 for providing syntax information thereto to aid in the selection of idiomatic phraseology.

Sentence forming unit 150 also inserts codes for punctuation marks. The punctuation information is supplied to sentence forming unit 150 by a punctuation dictionary 154.

The sequence of codes generated or transfered by sentence forming unit 150 is loaded into an output buffer 156. Buffer 92 is connected via an output lead 222 to a monetary decoder 224 which recognizes that a sequence of digital signals stored in buffer 192 encodes a numerical amount which is a monetary sum. Decoder 224 decodes that sequence to determine the amount involved, and also decodes the characters identifying the currency. To that end, decoder 224 compares selected characters or symbols in the document in buffer 56 with electrically encoded symbols of different world currencies stored in an electronic dictionary 226.

Decoder 224 transfers to currency converter 228 the encoded amount and the encoded currency, as detected and deciphered by the decoder. Inasmuch as it is expected that a single currency will be the desired output currency, corresponding to the country in which the facsimile receiver is located, currency converter 226 is preprogrammed to effectuate monetary conversions from one or more input currencies to a single output currency. Alternatively, currency converter 206 may be connected to a currency identification unit similar to unit 210 which would serve to determine the output currency, e.g., in accordance with an input signal from a keyboard or other input device.

In response to the signals from decoder 224 identifying the input currency, currency converter 228 accesses a conversion rate table 232 to obtain a conversion rate from the input currency to the output currency. Using the retrieved conversion rate, currency converter 228 calculates an amount in the output currency equivalent to the amount specified in the input document in the input currency. Currency converter 228 then inserts the converted or equivalent amount into the translated document, which is stored in buffer 156. That converted or equivalent monetary amount may be substituted for the original amount or, alternatively, may be inserted as an addition (e.g., in parentheses) to the document.

Conversion rate table 232 is provided with an input 234 for enabling periodic (e.g., daily) updating of the conversion rate contents of the table. The updating may be done automatically, for example, in response to signals received from a service facility to which organizations subscribe to obtain the updated currency conversion rates.

Buffer 156 may be provided with a digitization circuit (not shown) for converting the sequence of word, phrase and punctuation codes into a digitized sequence of bits representing light or dark values of an array of contigous regions on a two-dimensional document, such a digitized sequence conforming in part to a printer control signal in a conventional facsimile transmission machine. Buffer 156 is connected to printer 20 (FIG. 2) for controlling the printing operation thereof.

The telecommunications device of FIG. 2, including the translator/converter 18 of FIGS. 5A and 5B, is adapted specially for the processing of documents which contain information solely in alphanumeric form. However, the device can also handle documents including, for example, graphic or pictorial type information. Such information is transfered through translator/converter 18 without processing into linguistic codes.

Figure 6:
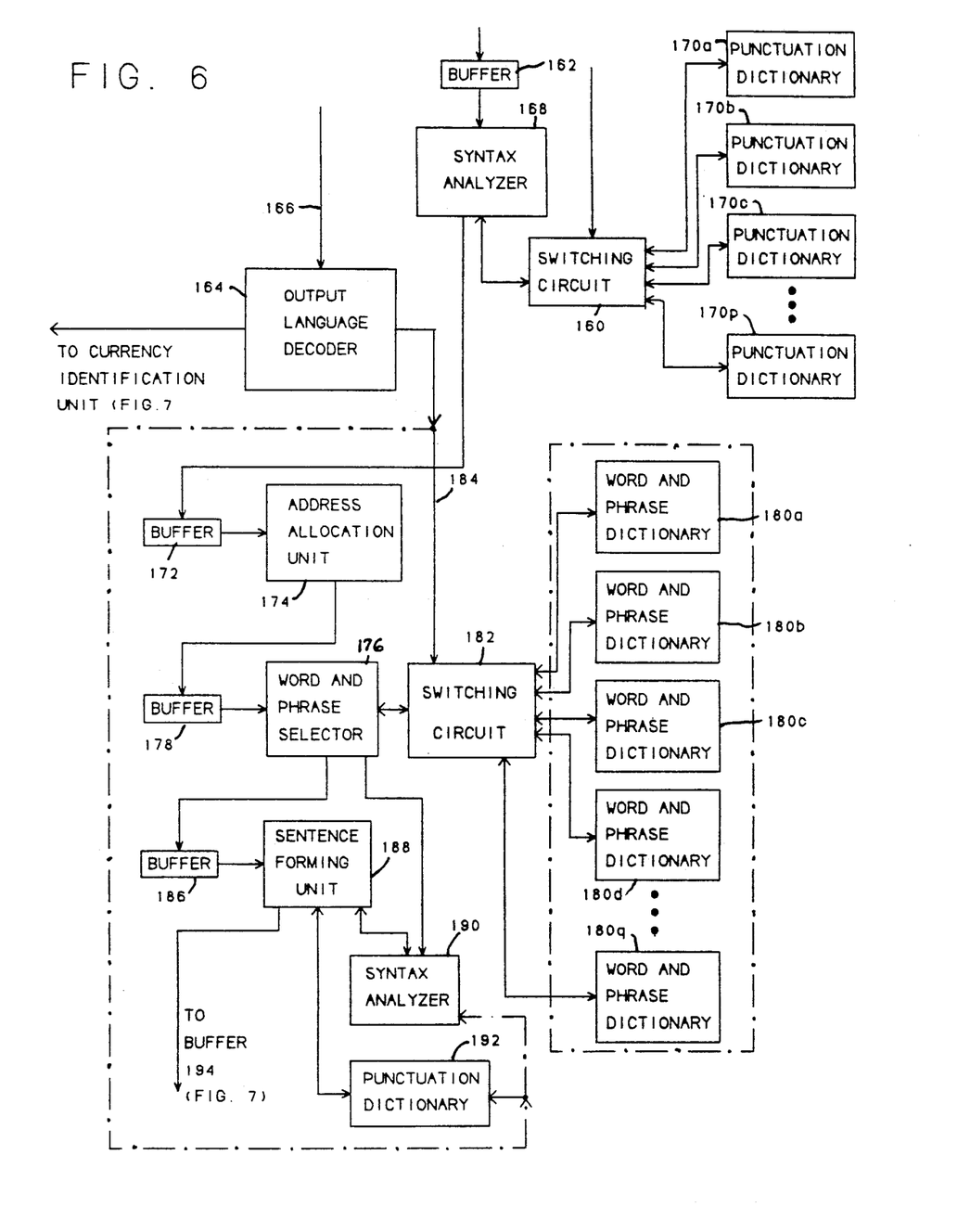

Translator/converter 38 of telecommunications device 24 of FIG. 3 may be configured as illustrated in FIGS. 5A and 6. Buffer 102 in FIG. 5A is thus connected to receiver 36 (FIG. 3) rather than to receiver 16 (FIG. 2), while input language decoder 114 and phrase recognition unit 124 (FIG. 5A) are respectively connected to a switching circuit 160 and a buffer or memory unit 162 shown in FIG. 6. In addition, buffer 102 (FIG. 5A) is connected to an output language decoder 164 (FIG. 6) via a lead 166.

Decoder 164 functions in the same way as decoder 80 depicted in FIG. 4. Decoder 164 is operatively connected to input buffer 102 for determining from an incoming input document bit stream a language code inserted, for example, by a transmitter of a telecommunications device at which an incoming document originates. The code identifying the desired output language is inserted into the bit stream in response to a manual selection by a human operator. Alternatively, decoder 164 may be directly connected to another input device, such as a keyboard (see, e.g., keyboard 82 in FIG. 4), for determining from input signals therefrom, the identity of a selected output language.

As discussed hereinabove with reference to FIG. 5B, the buffer 162 is fed a sequence of character codes, word codes and idiomatic phrase codes by phrase recognition unit 124. Thet code sequence in buffer 162 is accessed by a syntax analyzer 168 which examines sentence structure, in conjunction with punctuation and other grammatical rule information stored in a punctuation dictionary 170a, 170b, 170c, . . . 170p selected by switching circuit 160 under the control of decoder 114 (FIG. 5A). From punctuation, word order, parts of speech, and other meaning cues inherent in the language of the input document, analyzer 168 divides the words and phrases in buffer 162 into larger groups in part determinative of sentence meaning and generates digital codes indicative of that meaning. The results of the analysis by analyzer 168 are added to the digital codes in buffer 162, the augmented digital signal being loaded in another buffer or memory unit 172.

An address allocation unit 174 is connected to buffer 172 for reorganizing the character, word, phrase, clause and sentence codes therein and assigning a sequence of address codes for enabling a word and phrase selector 176 connected to a buffer or memory unit 178 at the output of address allocation unit 174 to retrieve approriate word and phrase codes of a preselected output language from a corresponding word and phrase dictionary 180a, 180b, 180c, 180d, . . . 180q. Dictionaries 180a, 180b, 180c, 180d, . . . 180q contain coded words and idiomatic expressions for respective natural languages. Access of selector 176 to dictionaries 180a, 180b, 180c, 180d, . . . 180q is controlled by a switching circuit 182 in response to signals from output language decoder 164.

Decoder 164 is provided with an output lead or multiple 184 extending to a switching input of switching circuit 182 for inducing that unit to connect word and phrase selector 176 to a dictionary 180a, 180b, 180c, 180d, . . . or 180q corresponding to a selected output language.

Word and phrase selector 176 outputs to a buffer or memory unit 186 a sequence of digital codes including the original character codes for untranslatable proper names and other unidentifiable phraseology, as well as new word and phrase codes taken from the selected dictionary 180a, 180b, 180c, 180d, . . . or 180q by word and phrase selector unit 176. The codes in buffer 186 are then organized by a sentence forming unit 188 into meaningful sequences in accordance with the syntax of the selected output language. Syntax information is supplied to sentence forming unit 188 by a syntax analyzer and storage unit 190. That unit includes a plurality of syntax dictionaries (not illustrated) for storing information about word order and sentence structure for each of a plurality of possible output languages and further includes a switching unit (not illustrated) connected to output lead or multiple 184 of decoder 164 for selecting the appropriate syntax dictionary in accordance with the selected output language.

Sentence forming unit 188 also inserts codes for punctuation marks. The punctuation information is supplied to sentence forming unit 188 by a punctuation dictionary 192 which comprises a plurality of punctuation sub-dictionaries (not illustrated) for storing punctuation information for each of the possible output languages and further comprises a switching unit (not illustrated) connected to output lead or multiple 184 of decoder 164 for selecting the appropriate punctuation subdictionary in accordance with the selected output language.

Figure 7:
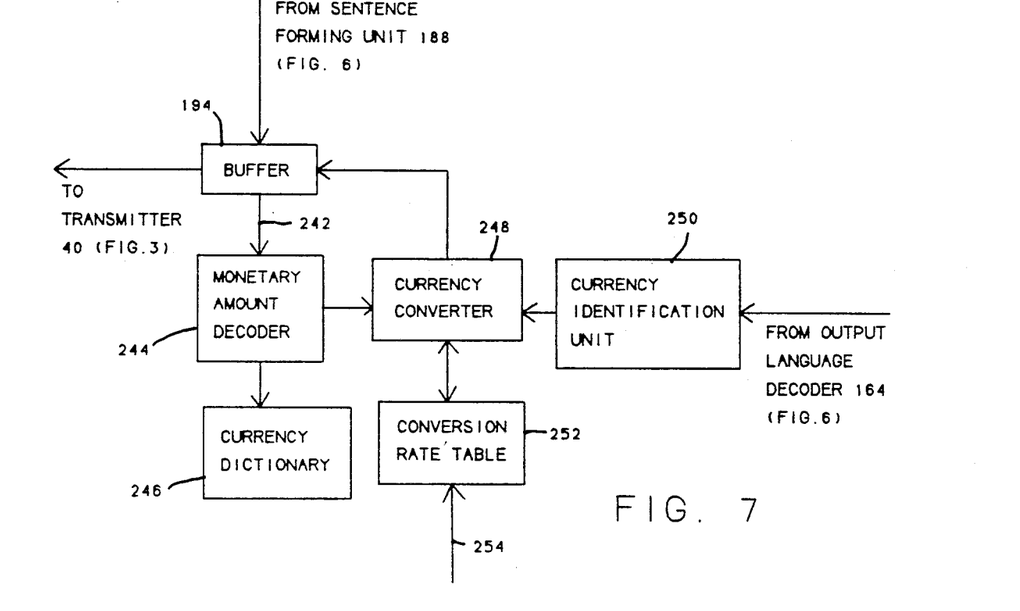
FIG. 7 is a block diagram basically of the currency conversion elements in the translating and currency conversion component of FIG. 3.

The sequence of codes generated or transfered by sentence forming unit 188 is loaded into an output buffer 194, illustrated in FIG. 7. As further illustrated in that drawing figure, buffer 194 is connected via an output lead 242 to a monetary decoder 244 which recognizes that a sequence of digital signals stored in buffer 194 encodes a numerical amount which is a monetary sum. Decoder 244 decodes that sequence to determine the amount involved, and also decodes the characters identifying the currency. To that end, decoder 244 compares selected characters or symbols in the document in buffer 194 with electrically encoded symbols of different world currencies stored in an electronic dictionary 246.

Decoder 244 transfers to currency converter 248 the encoded amount and the encoded currency, as detected and deciphered by decoder 244. Currency converter 246 also receives a signal from a currency identification unit 250 which serves to determine the output currency, i.e., the currency into which the subject monetary amount is to be converted. Currency identification unit 250 determines the output currency in response to a signal from output language decoder 164. That component monitors incoming signals from buffer 102 (FIG. 5A) which may indicate not only the destination language but also the output currency, which may or may not correspond to the destination language or to the destination country to which the document is to be transmitted.

In response to the signals from decoder 244 and currency identification unit 250 identifying the input currency and the output currency, currency converter 248 accesses a conversion rate table 252 to obtain a conversion rate from the input currency to the output currency. Using the retrieved conversion rate, currency converter 248 calculates an amount in the output currency equivalent to the amount specified in the input document in the input currency. Currency converter 248 then inserts the converted or equivalent amount into the translated document, which is stored in buffer 194. That converted or equivalent monetary amount may be substituted for the original amount or, alternatively, may be inserted as an addition (e.g., in parentheses) to the document.

Conversion rate table 252 is provided with an input 254 for enabling periodic (e.g., daily) updating of the conversion rate contents of the table. The updating may be done automatically, for example, in response to signals received from a service facility to which organizations subscribe to obtain the updated currency conversion rates.

Buffer 194 may be provided with a digitization circuit (not shown) for converting the sequence of word, phrase and punctuation codes into a digitized sequence of bits representing light or dark values of an array of contigous regions on a two-dimensional document, such a digitized sequence conforming in part to the output signal of a conventional facsimile transmission machine. Other portions of the output signal of the telecommunications device 24 of FIG. 3 are inserted in the digitized bit stream from buffer 194 by transmitter 40.

As discussed above with respect to FIGS. 4 and 5A and 5B, the telecommunications devices of the invention are adapted specially for the processing of documents which contain information solely in alphanumeric form. However, the devices can also handle documents including, for example, graphic or pictorial type information. Such information is transfered through the translator/converters, e.g., translator/converter 38, without processing into linguistic codes.

It is to be understood that translator/converters 12, 18 and 38 may each be realized in the form of a computer. A computer for performing the translating function of translator/converters 12, 18 and 38 is disclosed, for example, in U.S. Pat. No. 4,706,212 to Toma, the disclosure of which is hereby incorporated by reference. Such a language translating computer may include additional programming for performing the functions of character decoder 46, word recognition unit 50, and output language decoder 80 in FIG. 4 in the case of translator/converter 12, or character decoder 104, word recognition unit 108, and input language decoder 114 in FIG. 5A in the case of translator/converter 18 (and also decoder 164 in the case of translator/converter 38). Alternatively, those functions may be performed by separate preprocessors located upstream of the language translating computer. Of course, an additional processor may similarly be positioned downstream of the language translating computer in the case of translator/converter 38 to convert the language codes of a translated document into a bit stream suitable for processing by conventional facsimile machines.

If translator/converters 12 is implemented in the form of a computer, the computer may be provided with word processing type programming to enable the modification of a translated document by an operator using keyboard 15 (FIG. 1) in response to a display of a translated output document on monitor 11 or a printout of the document from printer 13. Translator/converters 18 and 38 may likewise be provided with such peripheral equipment and programming for enabling modification of translated output documents by an operator, prior to re-transmission of the output document by transmitter 40 (FIG. 3) or printing by printer 20 (FIG. 2).

It is to be noted that such operator assisted translation may be particularly important during an initial implementation stage, e.g., for possible output languages which do not yet have an electronic dictionary. Such operator assistance may also similarly be necessary for purposes of determining the meaning of an input document which is in a rare or unusual natural language.

Figure 8:
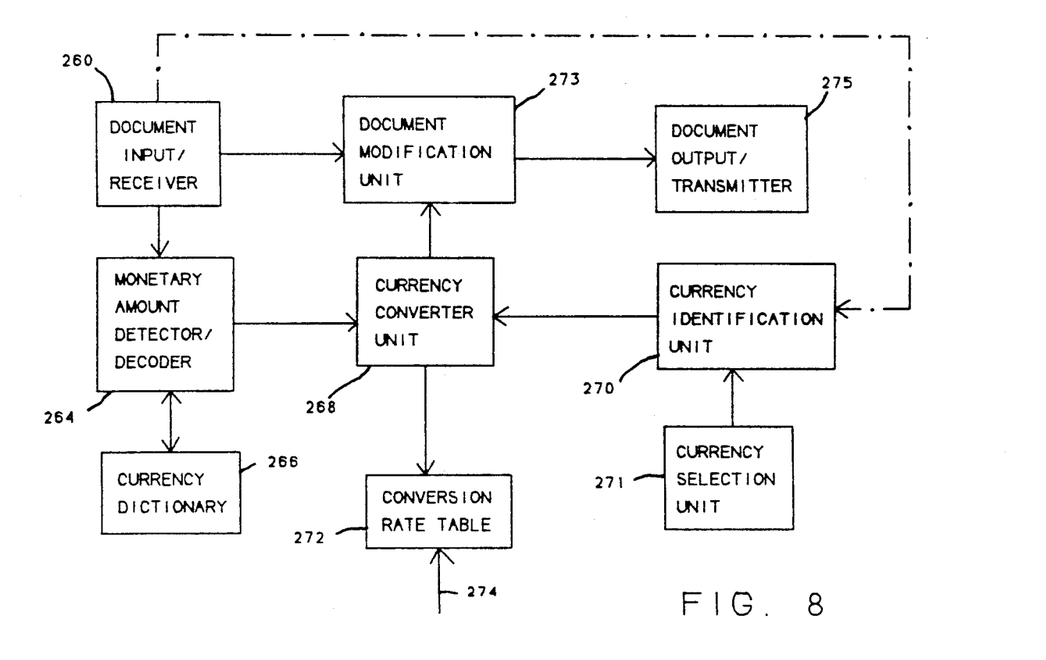
FIG. 8 is a block diagram showing a currency conversion assembly particularly for use in telecommunications systems as part of a facsimile device, in accordance with the present invention.

As illustrated in FIG. 8, the automatic currency conversion function of translator/converters 12, 18 and 38 may be implemented independently of the language translation function. This independent operation is useful, for example, within multinational corporations where all documentation and transactions are traditionally conducted in a single language. In addition, some applications may call for the transmission of financial documents only among countries which all have the same home language (e.g., English).

As shown in FIG. 8, a telecommunications device with a currency conversion capability comprises a document input component 260, which may take the form of a scanner in a facsimile machine, as discussed above. Alternatively, document input component 260 may be a desk top or other type computer which is used to generate a financial document. Component 260 may alternatively take the form of a receiver of a facsimile machine, which generates a document in encoded form upon receiving the document (in a coded form) over a telecommunications link.

Document input component 260 is connected to a detector/decoder 264 which functions to recognize that a signal from input component 260 encodes a monetary amount and to decode at least that portion of the signal which includes the monetary amount. The recognition or detection step may be implemented by detector/decoder 264 by accessing a currency dictionary 266 which stores codes for currency symbols. Detector/decoder 264 outputs to a currency converter 268 a signal identifying the input currency and the amount. Currency converter 268 also receives a signal from a unit 270 which identifies the target or output currency.

Currency identification unit 270 determines the output currency in response to a signal from a currency selection unit 271. That unit may take the form of a keyboard or other peripheral device, whereby an operator, either at a transmitting station or a receiving station, or even at a central facility, enters a command instructing the currency converter as to the identity of the target or output currency.

In response to the signals from decoder 264 and currency identification unit 270 identifying the input currency and the output currency, currency converter 268 accesses a conversion rate table 272 to obtain a conversion rate from the input currency to the output currency. Using the retrieved conversion rate, currency converter 268 calculates an amount in the output currency equivalent to the amount specified in the input document in the input currency. A document modification unit 273 connected to currency converter 268 and to document input component 260 then inserts the converted or equivalent amount into the document, in response to signals from the currency converter. That converted or equivalent monetary amount may be substituted for the original amount or, alternatively, may be inserted as an addition (e.g., in parentheses) to the document. Upon modification of the document by unit 273, an output component 275 connected to unit 273 produces the document in a visually perceivable form, e.g., on a monitor screen or on paper, and/or transmits the modified document to a remote location, as in a conventional facsimile machine.

Conversion rate table 272 is provided with an input 274 for enabling periodic (e.g., daily) updating of the conversion rate contents of the table. The updating may be done automatically, for example, in response to signals received from a service facility to which organization subscribe to obtain the update currency conversion rates.

Although the invention has been described in terms of particular embodiments and applications, one of ordinary skill in the art, in light of this teaching, can generate additional embodiments and modifications without departing from the spirit of or exceeding the scope of the claimed invention. For example, the monetary conversion circuitry may be connected to a buffer other than the final buffer 92, 156 or 194. Accordingly, it is to be understood that the drawings and descriptions herein are proferred by way of example to facilitate comprehension of the invention and should not be construed to limit the scope thereof.

What is claimed is:

1. A telecommunications device comprising:
   document input means for generating in a digitally encoded format a document including a representation of a monetary amount in a first currency;
   recognition means operatively connected to said document input means for recognizing said monetary amount in said first currency;
   identification means for identifying a second currency;
   conversion means operatively connected to said recognition means and said identification means for converting said monetary amount to an equivalent amount in said second currency; and
   transmission means operatively connected to said conversion means for transmitting said equivalent amount in digitally encoded form to a remote location.

2. The device defined in claim 1 wherein said conversion means includes an electronic conversion table for storing monetary conversion rates from said first currency to said second currency.

3. The device defined in claim 1 wherein said conversion means includes an electronic conversion table for storing monetary conversion rates from said first currency to a multiplicity of different currencies.

4. The device defined in claim 3, further comprising currency selection means operatively connected to said identification means and said electronic conversion table for selecting one of said plurality of different currencies as said second currency.

5. The device defined in claim 4, further comprising destination selection means operatively connected to at least one of said document input means and said transmission means for selecting an ultimate destination of said document, said identification means being operatively connected to said destination selection means for identifying said second currency in accordance with a selected destination of said document.

6. The device defined in claim 1, wherein said identification means includes input means for enabling an operator to direct selection of said second currency from among a plurality of different currencies.

7. The device defined in claim 1, further comprising output means operatively connected to said conversion means for producing an output document including said equivalent amount in a visually readable format.

8. The device defined in claim 1 wherein said document input means includes scanning means for generating said document from a printed copy thereof.

9. The device defined in claim 1 wherein said document input means includes means for generating, in a digitally encoded format in said document, words in a first natural language, further comprising translation means operatively connected to said document input means for translating said words to digitally encoded words of a second natural language, said transmission means being operatively connected to said translation means for transmitting said digitally encoded words to said remote location, together with said equivalent amount.

10. A method for communicating monetary information, comprising the steps of:
    generating a first digital signal encoding the monetary information in a first currency;
    automatically generating, from said first digital signal, a second digital signal encoding the monetary information in a second currency; and
    transmitting the second digital signal to a remote location.

11. The method defined in claim 10 wherein said step of generating includes the step of scanning a printed document including the monetary information in said currency.

12. The method defined in claim 10 further comprising the step of at least partially automatically selecting said second currency from one of a plurality of different currencies.

13. The method defined in claim 12, further comprising the step of selecting a destination of said second digital signal, said second currency being automatically selected in accordance with said destination.

14. The method defined in claim 10, further comprising the step of producing an output document including said monetary information in said second currency in a visually readable format.

15. A telecommunications device comprising:
    receiving means for receiving, from a remote transmitting station and in a digitally encoded format, an input document including a monetary amount in a first currency;
    recognition means operatively connected to said receiving means for recognizing said monetary amount in said first currency;
    conversion means operatively connected to said recognition means and said identification means for converting said monetary amount to an equivalent amount in a second currency; and
    output means operatively connected to said conversion means for producing an output document including said equivalent amount in said second currency in a visually readable format.

16. The device defined in claim 15 wherein said output means includes means operatively connected to said receiving means for producing said input document including the monetary amount in said first currency in a visually readable format.

17. The device defined in claim 15 wherein said conversion means includes an electronic conversion table for storing monetary conversion rates from said first currency to said second currency.

18. The device defined in claim 15 wherein said conversion means includes an electronic conversion table for storing monetary conversion rates from a multiplicity of different currencies to said second currency.

19. The device defined in claim 15 wherein said receiving means includes means for receiving in said input document words in a first natural language, further comprising translation means operatively connected to said receiving means for translating said words to digitally encoded words of a second natural language, said output means including means for producing in said output document said digitally encoded words in said second natural language in a visually readable format.

20. A method for communicating monetary information, comprising the steps of:
    receiving from a remote transmitting station a first digital signal encoding the monetary information in a first currency;

at least partially automatically generating, from said first digital signal, a second digital signal encoding the monetary information in a second currency; and in response to said second digital signal, producing an output document including the monetary information in said second currency in a visually readable format.

21. The method defined in claim 20 wherein said step of generating said second digital signal includes the step of determining from an electronic currency conversion table an electrically encoded amount of said second currency corresponding to an amount of said first currency.

22. The method defined in claim 20 wherein said step of producing includes the step of displaying said output document on a monitor.

23. The method defined in claim 20 wherein said step of producing includes the step of printing said output document.

24. A telecommunications device comprising:

receiving means for receiving, from a remote transmitting station and in a digitally encoded format, an input document including a monetary amount in a first currency;

recognition means operatively connected to said receiving means for recognizing said monetary amount in said first currency;

identification means for identifying a second currency;

conversion means operatively connected to said recognition means and said identification means for converting said monetary amount to an equivalent amount in said second currency; and transmission means operatively connected to said conversion means for transmitting said equivalent amount in digitally encoded form to a remote location.

25. The device defined in claim 24 wherein said conversion means includes electronic conversion table means for storing monetary conversion rates among a multiplicity of different currencies.

26. The device defined in claim 24 wherein said identification means includes means for determining the identity of said second currency from an ultimate destination of said document.

27. The device defined in claim 24 wherein said identification means includes means for determining the identity of said second currency from a code word transmitted with said input document from said remote transmitting station.

28. The device defined in claim 24 wherein said receiving means includes means for receiving in said input document words in a first natural language, further comprising translation means operatively connected to said receiving means for enabling translation of said words to digitally encoded words of a second natural language, said transmission means being operatively connected to said translation means for transmitting said digitally encoded words to said remote location.

29. A telecommunications method comprising the steps of:

receiving, from a first remote location and in a digitally encoded format, an input document including amounts in a first currency;

at least partially automatically converting said amounts to digitally encoded amounts of a second currency; and transmitting said digitally encoded amounts to a second remote location.

30. The method defined in claim 29 wherein said step of converting includes the step of accessing an electronic currency conversion table.

31. The method defined in claim 30 wherein said step of converting further includes the steps of determining the identity of said first currency, determining the identity of said second currency, and accessing said conversion table in accordance with the determination of said first currency and said second currency.

32. The method defined in claim 31 wherein said step of determining the identity of said second currency is implemented by determining an ultimate destination of said document.

33. The method defined in claim 31 wherein said step of determining the identity of said second currency is implemented by detecting a code word transmitted with said document from said first remote location.

* * * * *